United States Patent
Lee et al.

(10) Patent No.: US 12,000,459 B2
(45) Date of Patent: Jun. 4, 2024

(54) ADJUSTMENT DEVICE SWITCHABLE BETWEEN A ROTATABLE STATE OR A LOCKED STATE

(71) Applicant: PEGATRON CORPORATION, Taipei (TW)

(72) Inventors: Chung-Wei Lee, Taipei (TW); Ting-Hao Yang, Taipei (TW); Ching-Sung Yeh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 18/067,868

(22) Filed: Dec. 19, 2022

(65) Prior Publication Data
US 2023/0250863 A1 Aug. 10, 2023

(30) Foreign Application Priority Data
Feb. 9, 2022 (TW) .................................. 111104819

(51) Int. Cl.
*F16H 19/08* (2006.01)
*A42B 3/14* (2006.01)

(52) U.S. Cl.
CPC .............. *F16H 19/08* (2013.01); *A42B 3/145* (2013.01)

(58) Field of Classification Search
CPC ................................ A42B 3/145; F16H 19/08
See application file for complete search history.

(56) References Cited

U.S. PATENT DOCUMENTS

| 10,251,289 | B2 | 4/2019 | Chen et al. | |
| 10,873,799 | B2 | 12/2020 | Wang et al. | |
| 2010/0095438 | A1 | 4/2010 | Moelker | |
| 2011/0265254 | A1* | 11/2011 | Ma | A61H 7/006 2/420 |
| 2015/0074876 | A1* | 3/2015 | Chiang | A42B 3/145 2/418 |
| 2018/0295733 | A1 | 10/2018 | Wen et al. | |

(Continued)

FOREIGN PATENT DOCUMENTS

| CN | 201578546 U | 9/2010 |
| CN | 211426934 U | 9/2020 |
| CN | 109298527 B | 2/2021 |

(Continued)

*Primary Examiner* — Charles A Fox
*Assistant Examiner* — Gregory T Prather
(74) *Attorney, Agent, or Firm* — McClure, Qualey & Rodack, LLP

(57) ABSTRACT

An adjustment device includes a base, a ratchet wheel assembly and a fixing rod. The base includes an accommodating groove and ratchet teeth. The ratchet wheel assembly is rotatably accommodated in the accommodating groove and includes a body, an elastic arm, and a pawl. The elastic arm includes a first connecting segment connected to the body and a second connecting segment connected to the pawl. The pawl may engage with one of the ratchet teeth. The fixing rod movably extends between the body and the elastic arm. When the fixing rod is arranged between the second connecting segment and the body, the pawl is fixed to the ratchet teeth, so that the ratchet wheel assembly is positioned on the base. When the fixing rod is arranged between the first connecting segment and the body, the ratchet wheel assembly may rotate relative to the base.

9 Claims, 6 Drawing Sheets

(56) References Cited

U.S. PATENT DOCUMENTS

2020/0121017 A1\* 4/2020 King .................. A42B 3/14
2021/0002096 A1 1/2021 Wang

FOREIGN PATENT DOCUMENTS

| JP | H08-27613 A | 1/1996 |
|---|---|---|
| TW | M423458 U | 3/2012 |
| TW | 201221123 A | 6/2012 |
| TW | M621057 U | 12/2021 |

\* cited by examiner

ADJUSTMENT DEVICE SWITCHABLE BETWEEN A ROTATABLE STATE OR A LOCKED STATE

CROSS-REFERENCE TO RELATED APPLICATION

This application claims the priority benefit of Taiwan application serial no. 111104819, filed on Feb. 9, 2022. The entirety of the above-mentioned patent application is hereby incorporated by reference herein and made a part of this specification.

BACKGROUND

Technical Field

The present disclosure relates to an adjustment device, and in particular, to an adjustment device configured for tightness adjustment and locking.

Description of Related Art

Currently, a head-mounted display device is becoming increasingly popular, and various wearing structures are becoming increasingly diversified. As an example, an elastic strip-like structure uses the feature of elasticity of an elastic strip to fit different head sizes. An inelastic fixing strip generally fits different head sizes by using an adjustment device that may adjust the fixing strip. For example, an adjusting structure is connected to two ends of the fixing strip, and a spacing between the fixing strips is tightened or loosened through adjustment of the adjustment device, to adjust tightness of the fixing strip when worn, so as to match different head shapes or be suitable for the required tightness for different wearing positions.

However, most adjustment devices use tight fittings or complex gear assemblies to achieve the effect of limiting and fixing. However, through this manner, the entire structure becomes larger or thicker, and a weight of the entire structure is also increased. Therefore, when the structure is applied to, for example, the head-mounted display device, the weight of the head-mounted display device when worn on the head is increased, or the entire device becomes excessively large.

SUMMARY

In view of the above, an embodiment of the present disclosure provides an adjustment device. The adjustment device includes a base, a ratchet wheel assembly, and a fixing rod. The base includes an accommodating groove and a plurality of ratchet teeth. The plurality of ratchet teeth is arranged on an inner side wall of the accommodating groove. The ratchet wheel assembly is rotatably accommodated in the accommodating groove and includes a body, an elastic arm, and a pawl. The elastic arm is arranged on a side of the body and includes a first connecting segment and a second connecting segment that are connected. The first connecting segment is connected to the body. The second connecting segment is connected to the pawl, and the pawl is adapted to engage with the plurality of ratchet teeth. The fixing rod movably extends between the body and the elastic arm of the ratchet wheel assembly. When the fixing rod is arranged between the second connecting segment and the body, the pawl is fixed to one of the plurality of ratchet teeth, so that the ratchet wheel assembly is positioned on the base. When the fixing rod is arranged between the first connecting segment and the body, the ratchet wheel assembly is adapted to rotate relative to the base.

In this way, the adjustment device in the embodiment of the present disclosure may cause the ratchet wheel assembly to be in a rotatable state or a locked state by moving the fixing rod. When the fixing rod is moved to a position between the first connecting segment and the body, the ratchet wheel assembly is in the rotatable state. When the fixing rod moves from the position between the first connecting segment and the body to a position between the second connecting segment and the body, the pawl is fixed to the ratchet teeth, so that the ratchet wheel assembly is positioned on the base and cannot be driven and the ratchet wheel assembly is in the locked state. In this way, the fixing rod arranged to extend through the ratchet wheel assembly may be accommodated in an intrinsic structure space, without the need to increase an overall structure thickness to arrange an anti-rotation structure. In addition, the fixing rod is simpler and more convenient to operate than a complicated gear assembly, so that the user can operate the anti-rotation structure more intuitively and conveniently.

DESCRIPTION OF THE EMBODIMENTS

Figure 1:
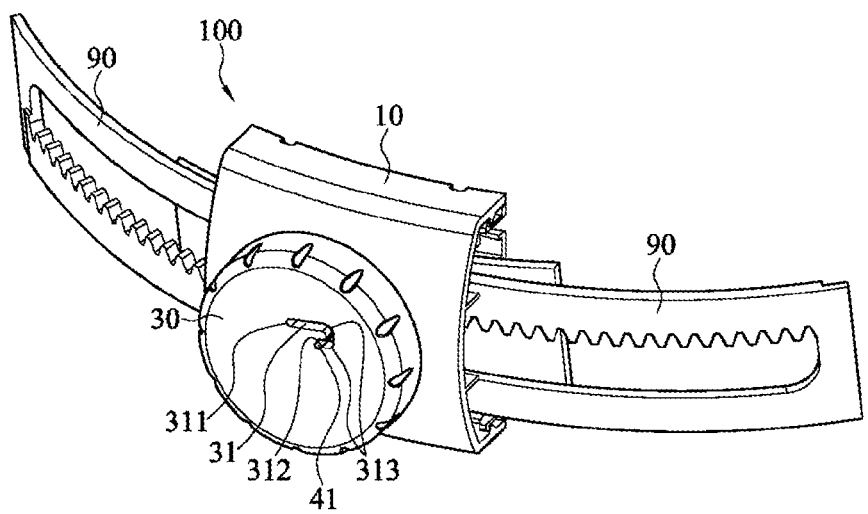
FIG. 1 is a schematic diagram of an adjustment device with a fixing rod at a rotation position and a fixing strip according to an embodiment of the present disclosure.

Embodiments are provided below for detailed description. However, the embodiments are merely used as examples for illustration, and do not limit the protection scope of the present disclosure. In addition, some elements are omitted in the drawings in the embodiments to clearly show the technical features of the present disclosure. Same reference numerals are used for denoting same or similar components in all of the drawings.

Figure 2:
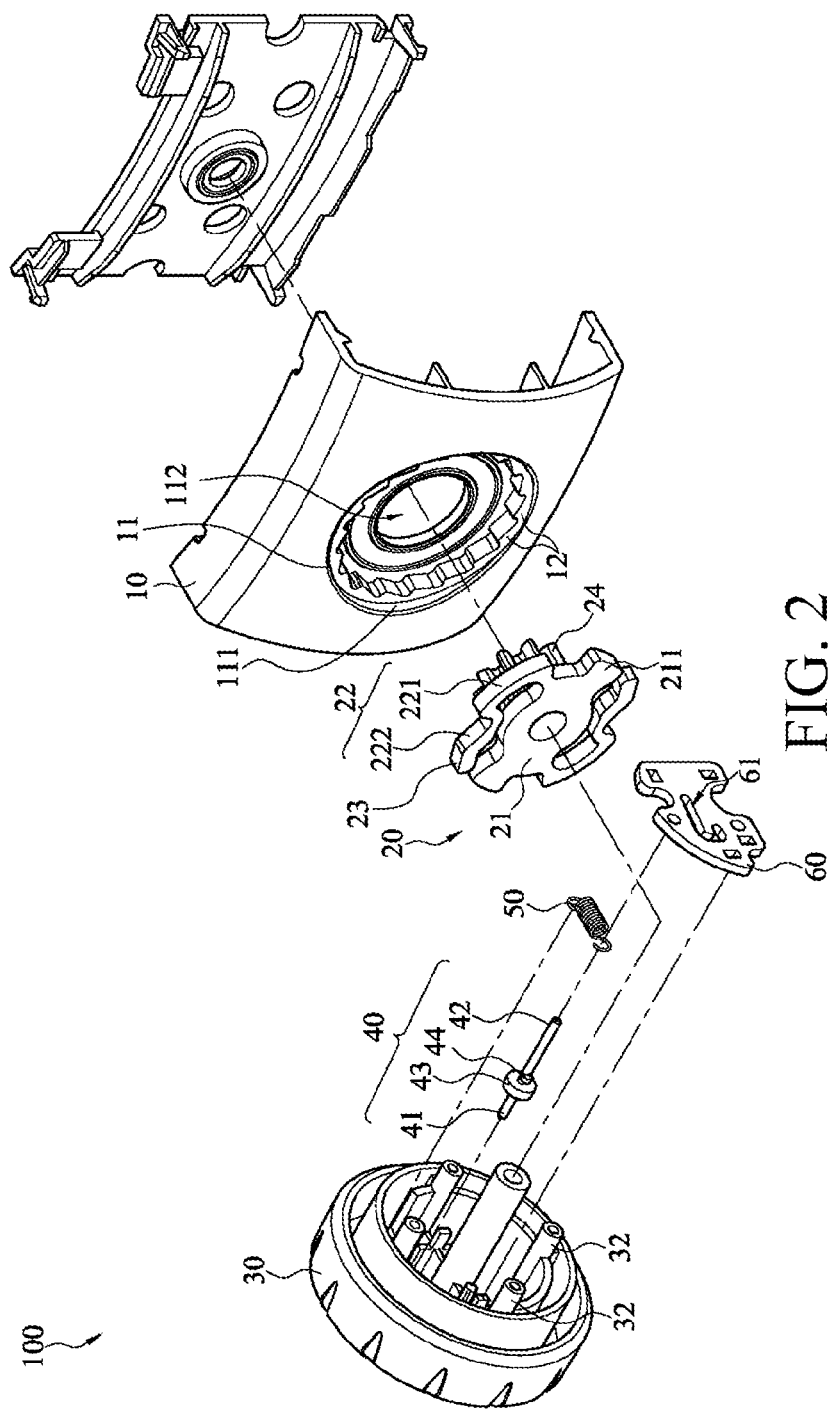
FIG. 2 is a schematic exploded view of an adjustment device according to an embodiment of the present disclosure.
Figure 3:
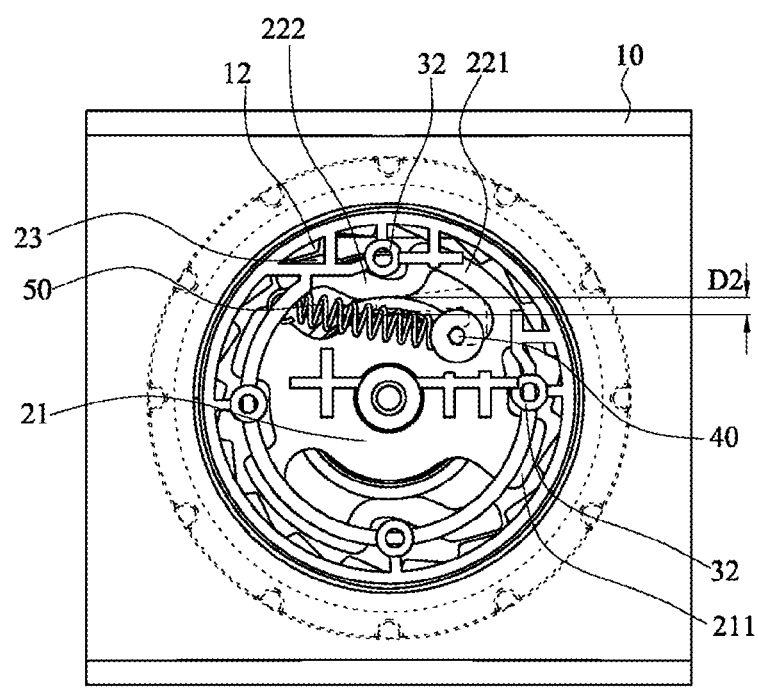
FIG. 3 is a front view of an adjustment device with a fixing rod at a rotation position and some components omitted according to an embodiment of the present disclosure.
Figure 4:
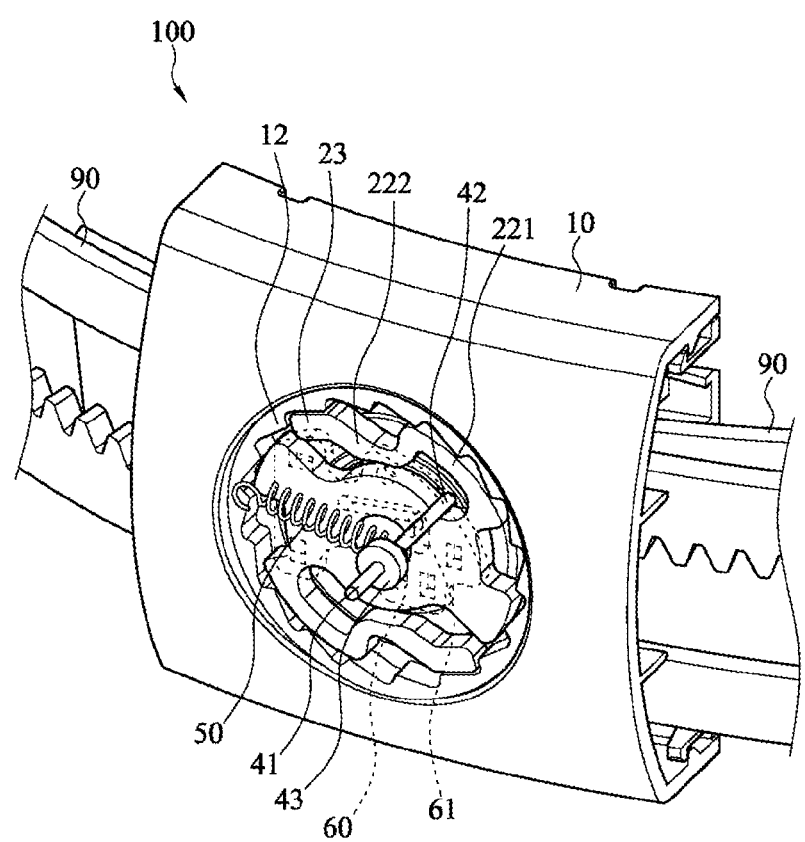
FIG. 4 is a schematic diagram of an adjustment device with a fixing rod at a rotation position and a knob omitted according to an embodiment of the present disclosure.
Figure 5:
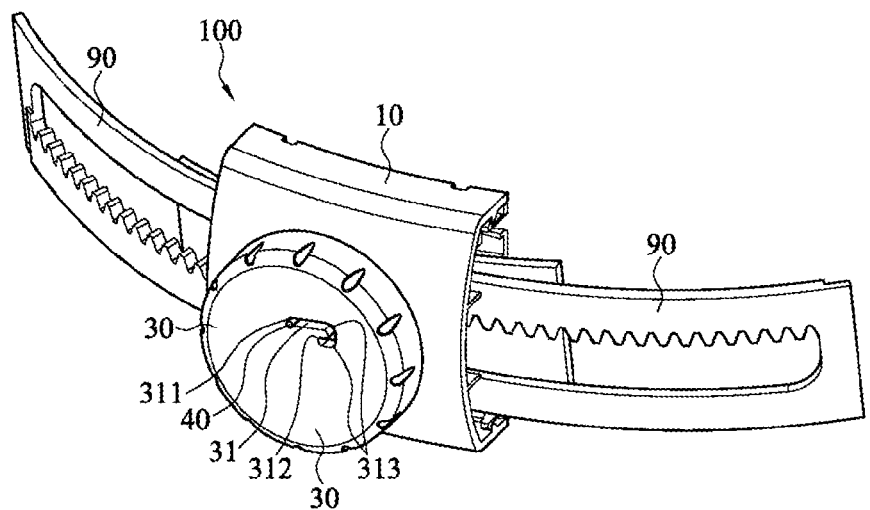
FIG. 5 is a schematic diagram of an adjustment device with a fixing rod at an anti-rotation position and a fixing strip according to an embodiment of the present disclosure.
Figure 6:
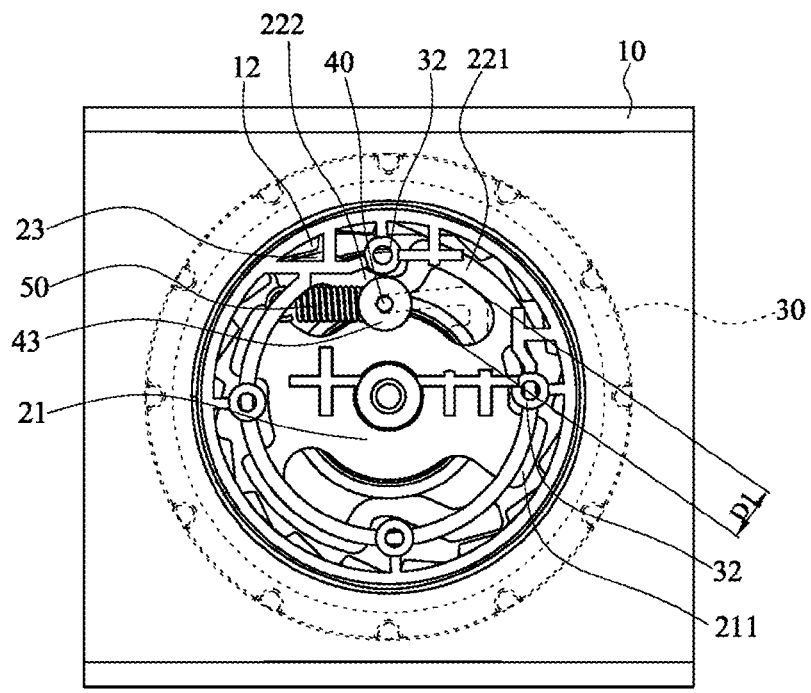
FIG. 6 is a front view of an adjustment device with a fixing rod at an anti-rotation position and some components omitted according to an embodiment of the present disclosure.
Figure 7:
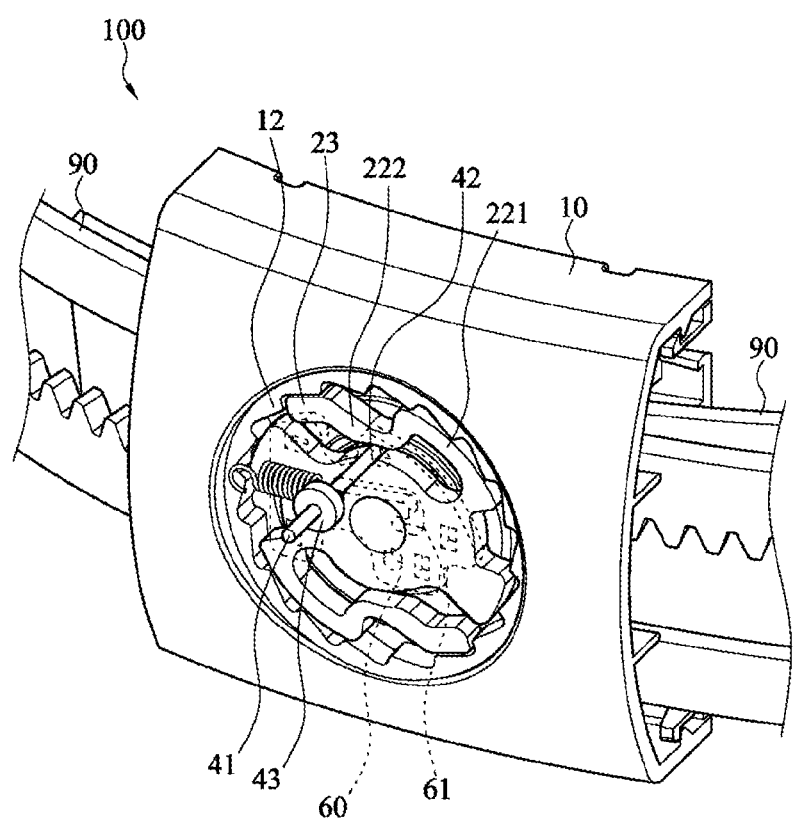
FIG. 7 is a schematic diagram of an adjustment device with a fixing rod at an anti-rotation position and a knob omitted according to an embodiment of the present disclosure.

FIG. 1 is a schematic diagram of an adjustment device with a fixing rod at a rotation position and a fixing strip according to an embodiment of the present disclosure. FIG. 2 is a schematic exploded view of an adjustment device according to an embodiment of the present disclosure. FIG. 3 is a front view of an adjustment device with a fixing rod at a rotation position and some components omitted according to an embodiment of the present disclosure. FIG. 4 is a schematic diagram of an adjustment device with a fixing rod at a rotation position and a knob omitted according to an embodiment of the present disclosure. FIG. 5 is a schematic diagram of an adjustment device with a fixing rod at an anti-rotation position and a fixing strip according to an embodiment of the present disclosure. FIG. 6 is a front view of an adjustment device with a fixing rod at an anti-rotation position and some components omitted according to an embodiment of the present disclosure. FIG. 7 is a schematic diagram of an adjustment device with a fixing rod at an anti-rotation position and a knob omitted according to an embodiment of the present disclosure.

Referring to FIG. 1 to FIG. 2, in this embodiment, the adjustment device 100 includes a base 10, a ratchet wheel assembly 20, and a fixing rod 40. It can be seen from FIG. 1 that two fixing strips 90 may be inserted to extend through the base 10 of the adjustment device 100. Relative positions of the two fixing strips 90 are adjusted by rotating the ratchet wheel assembly 20, so that the two fixing strips 90 move close to or away from each other.

The base 10 includes an accommodating groove 11 and a plurality of ratchet teeth 12. The plurality of ratchet teeth 12 is arranged on an inner side wall 111 of the accommodating groove 11. The ratchet wheel assembly 20 is rotatably accommodated in the accommodating groove 11 of the base 10. It can be seen from FIG. 2 to FIG. 7 that the ratchet wheel assembly 20 includes a body 21, two elastic arms 22, and two pawls 23. Each of the elastic arms 22 is arranged on a side of the body 21. In this embodiment, the two elastic arms 22 are arranged on two opposite sides of the body 21. Each elastic arm 22 includes a first connecting segment 221 and a second connecting segment 222 connected to each other. The first connecting segment 221 is connected between the body 21 and the second connecting segment 222. The second connecting segment 222 is connected between the first connecting segment 221 and the pawl 23. The pawl 23 is adapted to engage with the plurality of ratchet teeth 12.

In this embodiment, the ratchet wheel assembly 20 is exemplified by two elastic arms 22 and two pawls 23 arranged on two opposite sides of the body 21. In other implementations, one elastic arm 22 and one pawl 23 may be arranged on only one side of the body 21, which can also achieve the operation of the ratchet wheel assembly 20. The pawl 23 connected to the second connecting segment 222 of the elastic arm 22 may move along the ratchet teeth 12 by an elastic force of the elastic arm 22 and be engaged with the ratchet teeth 12, to provide temporary positioning and operation feeling. Specifically, the pawl 23 and the plurality of ratchet teeth 12 may provide the operation feel of the user during the operation through a ratchet operation principle, and provide a function of temporary positioning when the two fixing strips 90 move close to or away from each other. Therefore, it is convenient for the user to move the fixing rod 40 until the ratchet wheel assembly 20 is in a rotatable state or a locked state. It is also unnecessary to worry that the two fixing strips 90 immediately move away from each other once the fixing rod 40 is moved until the ratchet wheel assembly 20 is in the rotatable state.

It can be seen from FIG. 1 and FIG. 3 that the fixing rod 40 movably extends between the body 21 and the elastic arm 22 of the ratchet wheel assembly 20. As shown in FIG. 5 to FIG. 7, when the fixing rod 40 is arranged between the second connecting segment 222 and the body 21, the pawl 23 is fixed to one of the ratchet teeth 12, so that the ratchet wheel assembly 20 is positioned on the base 10 and the ratchet wheel assembly 20 is in the locked state. As shown in FIG. 1 to FIG. 4, when the fixing rod 40 is arranged between the first connecting segment 221 and the body 21, the ratchet wheel assembly 20 is adapted to rotate relative to the base 10, so that the ratchet wheel assembly 20 is in the rotatable state.

In this way, the adjustment device 100 may cause the ratchet wheel assembly 20 to be in the rotatable state or in the locked state by moving the fixing rod 40. When an adjustment to the fixing strip 90 is to be performed, it is only necessary to move the fixing rod 40 to a position between the first connecting segment 221 and the body 21, so that the ratchet wheel assembly is in the rotatable state. After the fixing strip 90 has been adjusted to a required degree of tightness, the fixing rod 40 may be moved to a position between the second connecting segment 222 and the body 21. In this case, the ratchet wheel assembly 20 is in the locked state. In this way, relative movement of the fixing strips 90 during use upon adjustment to the relative positions can be avoided. Moreover, the fixing rod 40 that may be arranged to extend through the ratchet wheel assembly 20 may be accommodated in an intrinsic structure space, without the need to increase an overall structure thickness to arrange an anti-rotation structure. In addition, the arrangement of the fixing rod 40 is simpler and more convenient to operate than locking by using a complicated gear assembly, so that the user can operate the anti-rotation structure more intuitively and conveniently.

As shown in FIG. 1 and FIG. 2, in this embodiment, the adjustment device 100 further includes a knob 30 assembled to the base 10 and connected to the body 21 of the ratchet wheel assembly 20, to drive the ratchet wheel assembly 20. The fixing rod 40 includes a first end 41 and a second end 42 opposite to each other. The first end 41 extends through and protrudes from the knob 30, and the second end 42 extends through the ratchet wheel assembly 20. It can be seen from FIG. 1 that the first end 41 of the fixing rod protrudes from an outer surface of the knob 30, so that the user can conveniently operate and move the fixing rod 40. Further, it can be seen from FIG. 1 that the knob 30 includes a guide hole 31. The guide hole 31 has a first end portion 311 and a second end portion 312. In this embodiment, the guide hole 31 is hook-shaped. That is to say, two bent portions 313 are arranged between the first end portion 311 and the second end portion 312 of the guide hole 31, as shown in FIG. 5. In other implementations, only one bent portion 313 may alternatively be arranged between the first end portion 311 and the second end portion 312 of the guide hole 31, which is in an inverted L shape. The first end 41 of the fixing rod 40 movably extends through the guide hole 31. Specifically, as shown in FIG. 1, when the second end 42 of the fixing rod 40 is arranged between the first connecting segment 221 and the body 21, the first end 41 of the fixing rod 40 is arranged on the second end portion 312 of the guide hole 31. As shown in FIG. 4 and FIG. 5, when the second end 42 of the fixing rod 40 moves to a position between the second connecting segment 222 and the body 21, the first end 41 of the fixing rod 40 is arranged on the first end portion 311 of the guide hole 31.

In this way, when the fixing rod 40 extending through the guide hole 31 is operated and moved, taking the advantage of the one or more bent portions 313, the fixing rod 40 can be prevented from being accidentally moved during use. For example, when the fixing rod 40 is moved to the second end portion 312 and the user turns the knob 30 to drive the ratchet wheel assembly 20, the fixing rod 40 can be moved to the first end portion 311 without being easily detached from the second end portion 312 under the limitation provided by the bent portion 313.

In addition, it can be seen from FIG. 2 that the fixing rod 40 further includes an annular protrusion 43 arranged between the first end 41 and the second end 42 and adjacent to the knob 30. A diameter of the annular protrusion 43 is greater than a width of the guide hole 31. The annular protrusion 43 may abut against an inner side surface of the knob 30 to prevent the user from accidentally pulling out the fixing rod 40 during the operation.

In this embodiment, as shown in FIG. 2 and FIG. 3, a plurality of protruding posts 32 is arranged on an inner side of the knob 30. The protruding posts 32 are arranged on an outer periphery of the body 21 to drive the body 21. The elastic arm 22 arranged on an upper side is used as an example for description. The two protruding posts 32 are respectively arranged outside the first connecting segment 221 and outside the second connecting segment 222 of the elastic arm 22. When the knob 30 is rotated counterclockwise, the protruding post 32 outside the first connecting segment 221 pushes the first connecting segment 221, and the protruding post 32 outside the second connecting segment 222 pushes the second connecting segment 222 to move downward in the figure.

In addition, the body 21 has a protruding stop 211 adjacent to the first connecting segment 221. When the knob 30 is rotated clockwise, the protruding post 32 outside the first connecting segment 221 moves to abut against the protruding stop 211, thereby driving the body 21 to rotate clockwise. In this case, since the fixing rod 40 does not exist between the first connecting segment 221 and the body 21, the second connecting segment 222 may smoothly move downward, so that the pawl 23 smoothly passes through a protruding portion of one of the ratchet teeth 12 to engage with another tooth of the ratchet teeth 12.

Next, as shown in FIG. 2, FIG. 3, and FIG. 6, the adjustment device 100 of this embodiment may further include an elastic element 50 with one end connected to the knob 30 and another end connected to the fixing rod 40. In this embodiment, the elastic element 50 is an extension spring. As shown in FIG. 1 and FIG. 3, when the first end 41 of the fixing rod 40 is located at the second end portion 312 of the guide hole 31, the elastic element 50 is pulled apart to generate a restoring force, and then the first end 41 of the fixing rod 40 is fastened and abuts against the second end portion 312 of the guide hole 31. In this way, the fixing rod 40 can be prevented from being disengaged from the second end portion 312 of the guide hole 31 during the rotation of the knob 30. Once the fixing rod 40 is operated to move through all of the bent portions 313 and enter a straight segment, the fixing rod 40 may be pulled to the first end portion 311 of the guide hole 31 by the restoring force of the elastic element 50, and then quickly enters the anti-rotation position shown in FIG. 6.

In addition, it can be seen from FIG. 2 that the adjustment device 100 of this embodiment may further include a stopper 60 fixed to the knob 30, and the elastic element 50 is sandwiched between the knob 30 and the stopper 60. The stopper 60 may be assembled to the knob 30 after the fixing rod 40 and the elastic element 50 are assembled to the knob 30. The stopper 60 may be further glued to the knob 30 by heat welding or gluing. Alternatively, a structure engaged with each other may be arranged on the knob 30 and the stopper 60 respectively, so that the stopper 60 can be removed when needed. Movement of the elastic element 50 in a direction perpendicular to a paper surface can be limited by the stopper 60 to prevent the elastic element 50 from being disengaged from the knob 30.

In this embodiment, the stopper 60 includes a limiting hole 61, and the fixing rod 40 further extends through the limiting hole 61. It can be seen from FIG. 1 to FIG. 4 that the limiting hole 61 has a same shape as the guide hole 31, and is arranged parallel to the guide hole 31. The fixing rod 40 extends through both the guide hole 31 and the limiting hole 61. By limiting positions of the guide hole 31 and the limiting hole 61, the movement of the fixing rod 40 can be more stable without excessive tilting or rotation.

In addition, it can be seen from FIG. 2 that the fixing rod 40 may further include a bump 44 arranged between the knob 30 and the stopper 60, and one end of the elastic element 50 connected to the fixing rod 40 is arranged between the bump 44 and the knob 30. Further, the bump 44 may be arranged between the annular protrusion 43 and the second end 42, and the another end of the elastic element 50 (that is, an end connected to the fixing rod 40) is arranged between the annular protrusion 43 and the bump 44. In this way, axial displacement of the elastic element 50 on the fixing rod can be avoided.

In this embodiment, as shown in FIG. 3, a second spacing D2 is formed between the second connecting segment 222 and the body 21. As shown in FIG. 6, a first spacing D1 is formed between the first connecting segment 221 and the body 21, and the first spacing D1 is greater than the second spacing D2.

It can be seen from FIG. 3 and FIG. 4 that when the second end 42 of the fixing rod 40 is at the first spacing D1, the elastic arm 22 will not be stopped during the movement, so that the ratchet wheel assembly 20 is in the rotatable state. It can be seen from FIG. 5 and FIG. 7 that when the second end 42 of the fixing rod 40 is at the second spacing D2, the elastic arm 22 may be stopped by the fixing rod 40 during the movement, so that the ratchet wheel assembly is in the locked state.

Further, referring to FIG. 2, the ratchet wheel assembly 20 may further include a gear 24 connected to the body 21 and protruding from the base 10 through the accommodating groove 11. In this embodiment, the gear 24 passes through a through hole 112 in the middle of the accommodating groove 11, and extends through the two fixing strips 90. In this way, when the body 21 is driven to rotate, the gear 24 is also driven to rotate. By rotating clockwise or counterclockwise, end portions of the two fixing strips 90 are driven to move close to or away from each other, so as to adjust the tightness of the fixing strips 90.

In this way, the adjustment device 100 in the embodiment of the present disclosure may cause, by moving the fixing rod 40, the ratchet wheel assembly 20 to be in a rotatable state or a locked state. When the fixing strips 90 extending through the base 10 are to be adjusted, it is only necessary to move the fixing rod 40 to a position between the first connecting segment 221 and the body 21, so that the ratchet wheel assembly 20 is in the rotatable state. After the fixing strips 90 have been adjusted to a required degree of tightness, the fixing rod 40 may be moved to a position between the second connecting segment 222 and the body 21, and the pawl 23 is fixed to the ratchet teeth 12, so that the ratchet wheel assembly 20 is positioned on the base 10 and cannot be driven and the ratchet wheel assembly 20 is in the locked state. In this way, the fixing strips 90 can be prevented from being loosened during use upon completion of adjustment to the degree of tightness. Moreover, the fixing rod 40 that may be arranged to extend through the ratchet wheel assembly 20 may be accommodated in an intrinsic structure space, without the need to increase an overall structure thickness to arrange an anti-rotation structure, so that the user can operate the anti-rotation structure more intuitively and conveniently.

What is claimed is:

1. An adjustment device, comprising:
   a base, comprising an accommodating groove and a plurality of ratchet teeth arranged on an inner side wall of the accommodating groove;
   a ratchet wheel assembly, rotatably accommodated in the accommodating groove and comprising a body, an elastic arm, and a pawl, wherein the elastic arm is arranged on a side of the body and comprises a first connecting segment and a second connecting segment connected to each other, the first connecting segment is connected to the body, the second connecting segment is connected to the pawl, and the pawl is adapted to engage with the ratchet teeth;
   a fixing rod, movably extending between the body and the elastic arm of the ratchet wheel assembly, wherein the pawl is fixed to one of the ratchet teeth when the fixing rod is arranged between the second connecting segment and the body, so that the ratchet wheel assembly is positioned on the base, and the ratchet wheel assembly is adapted to rotate relative to the base when the fixing rod is arranged between the first connecting segment and the body; and
   a knob assembled to the base and connected to the ratchet wheel assembly, wherein the knob comprises a guide hole having a first end portion and a second end portion, the fixing rod movably extends through the guide hole, the fixing rod is arranged at the first end portion of the guide hole when the fixing rod moves to a position between the second connecting segment and the body, and the fixing rod is arranged at the second end portion of the guide hole when the fixing rod moves to a position between the first connecting segment and the body.

2. The adjustment device according to claim 1, wherein at least one bent portion is arranged between the first end portion and the second end portion of the guide hole.

3. The adjustment device according to claim 1, wherein the fixing rod further comprises an annular protrusion arranged adjacent to the knob, and a diameter of the annular protrusion is greater than a width of the guide hole.

4. The adjustment device according to claim 1, further comprising an elastic element having one end connected to the knob and another end connected to the fixing rod.

5. The adjustment device according to claim 4, further comprising a stopper fixed to the knob, wherein the elastic element is sandwiched between the knob and the stopper.

6. The adjustment device according to claim 5, wherein the stopper comprises a limiting hole, and the fixing rod further extends through the limiting hole.

7. The adjustment device according to claim 5, wherein the fixing rod further comprises a bump, the bump is arranged between the knob and the stopper, and the another end of the elastic element is arranged between the bump and the knob.

8. The adjustment device according to claim 1, wherein a first spacing exists between the first connecting segment and the body, a second spacing exists between the second connecting segment and the body, and the first spacing is greater than the second spacing.

9. The adjustment device according to claim 1, wherein the ratchet wheel assembly further comprises a gear, and the gear is connected to the body and extends through the accommodating groove and protrudes from the base.

* * * * *